May 22, 1934.　　　　I. H. FREESE　　　　1,959,821
PNEUMATIC GLASS FEEDER
Filed July 28, 1932
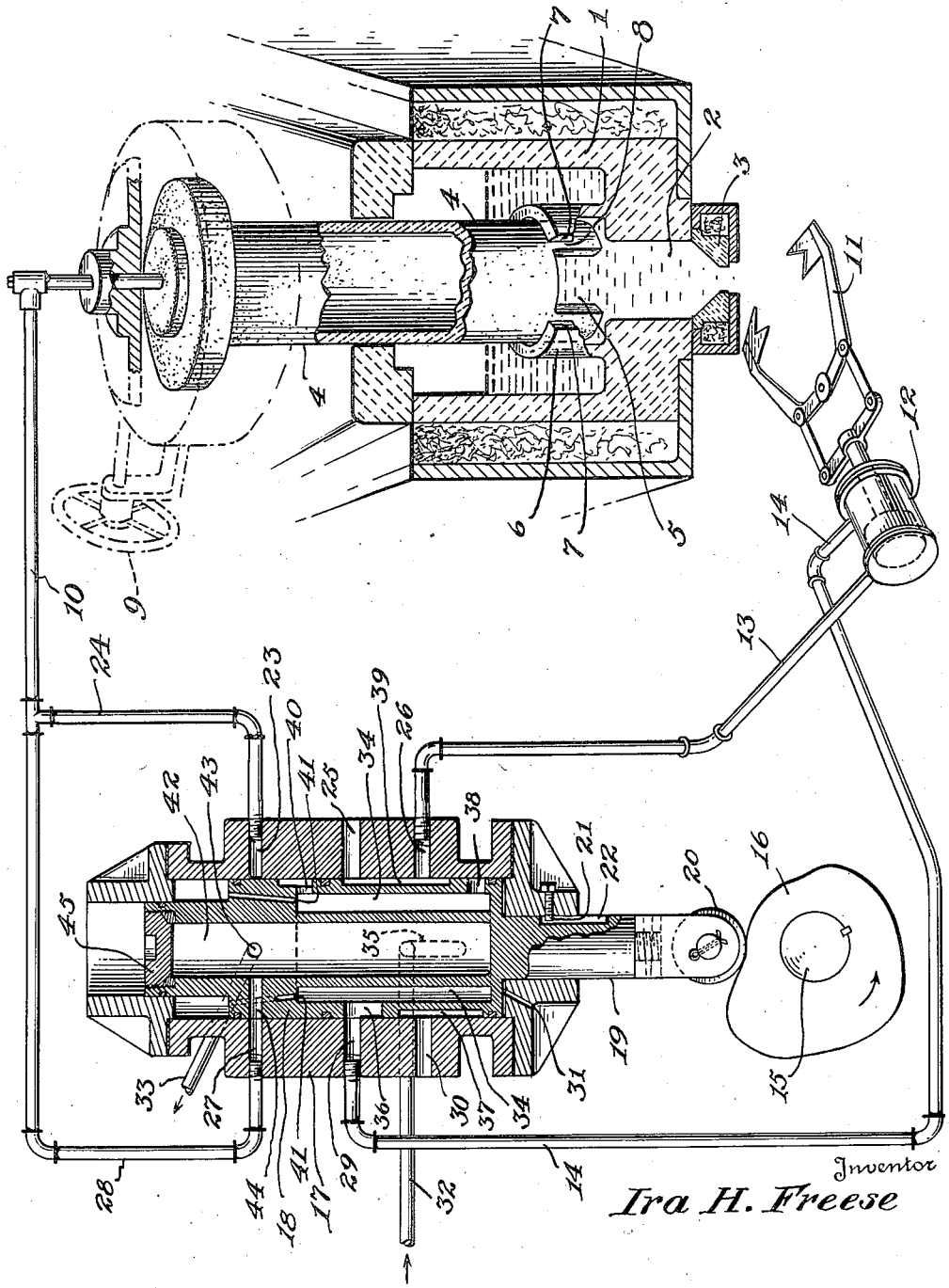
Inventor
Ira H. Freese Patented May 22, 1934

1,959,821

UNITED STATES PATENT OFFICE 1,959,821

PNEUMATIC GLASS FEEDER

Ira H. Freese, Clarksburg, W. Va., assignor to Hazel-Atlas Glass Co., Wheeling, W. Va., a corporation of West Virginia Application July 28, 1932, Serial No. 625,466

6 Claims. (Cl. 49—55)

The invention relates to glass feeders, particularly of the pneumatic type, in which the air pressure on the glass is periodically increased and decreased to form the glass charges, and one of the objects of the present invention is to greatly simplify the structure of such feeders, whereby the original cost is lowered, the maintenance is lowered, and the operation is simplified.

Another object of the invention is to provide a feeder of this type, in which both the plus and minus pressures are controlled by a single valve operated by a single cam.

A further object of the invention is to provide a simplified feeder in which it is neither necessary nor possible to make the various adjustments common to complex feeders of the prior art.

Numerous advantages of the invention will be apparent to those skilled in the art, from the following detailed description, when taken in connection with the accompanying drawing, in which, The figure is a vertical sectional view of the control mechanism, with the air bell and associated parts shown in perspective.

Refering to the drawing in more detail, numeral 1 indicates a conventional flow spout provided with the usual flow orifice 2, beneath which there is arranged the ordinary removable bushing 3. Numeral 4 refers to an air bell or tube which is in alignment with the flow orifice, and which has its lower end immersed in the molten glass. The air bell extends to the floor of the flow spout, except for a slight clearance. In the particular form herein illustrated, and which per se forms no part of the present invention, the lower end of the bell is cut away to form a port 5, which port preferably faces the front of the flow spout; i. e., it faces away from the melting furnace.

Surrounding the flow orifice and the lower end of the air bell 4, is a baffle or flange 6, which projects upwardly from, and is preferably formed integral with, the floor of the nose block, which is the term usually applied to the forward end portion of the flow spout. This baffle or flange 6 is of less height than the depth of the molten glass in the flow spout, but is of slightly greater height than that of the port 5. The baffle does not extend entirely around the lower end of the air bell, but ends some little distance from each side of the center line of the flow spout, as indicated by numerals 7, 7, to form a passage or port 8. This port also preferably faces the front end of the flow spout.

By rotatably adjusting the air bell the ports 5 and 8 may be brought into complete alignment, thereby providing a full volume flow of glass; or the air bell may be adjusted to any degree of alignment desired, to reduce the volume flow of glass to the desired extent. By this simple adjustment, the volume flow of glass may be accurately regulated, thereby providing a simple and efficient means for controlling the weight of the glass charges or gobs.

The air bell is rotatably adjusted in either direction by means of a hand wheel 9, and intermediate gear mechanism which need not be shown or described here, as mechanism for rotatably adjusting the air bell is fully disclosed in the patent to David Stenhouse 1,904,754, and per se forms no part of the present invention. Likewise, the particular construction of the air bell and the baffle associated therewith are shown and claimed in an application of James W. Ross, Ser. No. 618,569, filed June 21, 1932.

Connected with the upper end of the air bell is a pipe 10, by which air is alternately admitted to and exhausted from the interior of the air bell, to form the glass charges. The mechanism for controlling the pressure conditions in the air bell will be described shortly.

Arranged below the orifice bushing is a pair of conventional shears 11, which are diagrammatically illustrated. The shears are closed and opened by a cylinder 12: air pressure being admitted to the rear end of the cylinder by a pipe 13, and exhausted from the front end of the cylinder by a pipe 14, to close the shears; and air pressure being admitted to the front end of the cylinder by the pipe 14 and exhausted from the rear end of the cylinder by the pipe 13, to open the shears. The mechanism for controlling the operation of the shear cylinder will be described shortly.

It will be understood that the present invention is in no manner limited to use with the particular air bell construction disclosed herein, or to any particular mechanism for controlling the weight of the formed charges; as the present invention relates to apparatus for controlling the application of pressure and vacuum, and the operation of the shears, in combination with any preferred structure for applying the plus and minus pressures to the glass in the flow spout.

Numeral 15 refers to a cam shaft which is driven in time relation with a glass forming machine, by any desired mechanism. Keyed or otherwise secured to this cam shaft is a cam 16, and this single cam, by its control of a single valve, governs the time and duration of the application of pressure and vacuum for the feeding of the charges, and the admission and exhaust of pressure at opposite ends of the shear cylinder for the operation of the shears.

Numeral 17 refers to a valve casing in which is reciprocably mounted a valve head 18, having a valve stem 19. The free end of the valve stem is provided with a roller 20 which rides on the cam 16. The longitudinal movement of the valve head is controlled by the cam, and the valve head is prevented from rotating in the valve casing by means of a pin 21 which rides in a slot 22 provided in the valve stem.

The valve casing is provided with the following ports: port 23 which communicates with a pipe 24 connecting with previously described pipe 10 leading to the air bell, and by which connections pressure is supplied to the interior of the air bell; port 25 communicating with the atmosphere; port 26 communicating with pipe 13 leading to the rear end of the shear cylinder; port 27 which communicates with pipe 28 connecting with pipe 10 leading to the air bell, and by which connections the interior of the air bell is vacuumized to the desired degree; port 29 communicating with pipe 14 leading to the front end of the shear cylinder; port 30 communicating with the atmosphere; and port 31 which also communicates with the atmosphere and is solely for the purpose of preventing any pressure from being built up in the valve casing beneath the valve head. The valve casing is also provided with appropriate ports for connection with a pipe 32 leading from any desired source of pressure, and a pipe 33 communicating with any desired source of vacuum.

The valve head 17 is provided with an annular pressure chamber 34, and in order that this chamber may be in constant communication with the source of pressure through pipe 32, an elongated port 35 is provided in the wall of the valve head. Thus when the valve is reciprocated, in the manner to be described presently, pressure will be constantly introduced through this port 35 into the annular pressure chamber 34.

The pressure chamber is provided with a port 36, and when the parts are in the position shown in the drawing this port permits pressure to pass from the chamber to pipe 14 and thence to the front end of the shear cylinder 12 to open the shears. A vertical passage 37 in the wall of the valve head permits the pressure to exhaust from pipe 14 to port 30 and thence to the atmosphere, after port 36 has been moved to a position to shut off communication between the pressure chamber and pipe 14.

The annular pressure chamber is also provided with a port 38, and when the valve head is moved to a position to bring this port into alignment with port 26 of the valve casing, air under pressure will pass from the annular pressure chamber to pipe 13 and thence to the rear end of the shear cylinder to close the shears. A vertical passage 39 in the wall of the valve head permits the pressure to exhaust from pipe 13 to port 25 and thence to the atmosphere, when the parts are in the position shown in the drawing.

The pressure chamber is also provided with a port 40, and when the valve head is moved to a position to bring this port into alignment with the port 23 of the valve casing, air under pressure will pass from the annular pressure chamber to pipe 24 and thence through pipe 10 to the interior of the air bell to accelerate the flow of glass through the flow orifice 2.

The pressure chamber is also preferably provided with passages 41 which lead from the top of the annular pressure chamber 34 to the upper portion of the interior of the valve casing. This constant pressure above the valve head holds the roller 20 of the valve stem 19 against the face of the cam 16; thereby avoiding the use of springs or other mechanism for this purpose.

The central portion of the valve head is shown as hollowed out to form a small control vacuum chamber 42. In the particular form illustrated the wall of the vacuum chamber is provided with a port 43, and when the parts are in the position shown in the drawing this port communicates with pipe 33 which connects with a pump or vacuum line or vacuum tank. If preferred, the port 43 may be elongated so that the vacuum chamber 42 will be in constant communication with vacuum pipe 33, in all positions of the valve head.

Leading from the vacuum chamber is a port 44, and when the parts are in the position shown in the drawing so that port 44 aligns with port 27 of the valve casing, communication will be opened between the interior of the air bell and the vacuum pipe 33, whereby the interior of the air bell is vacuumized to the desired degree, to retard, stop, or reverse, the flow of glass through the flow orifice 2.

In the specific embodiment illustrated, in which the interior of the valve head is hollowed out to form the small central vacuum chamber 42, such chamber is closed at its upper end by means of a plug 45; but it will be understood, of course, that this centrally arranged vacuum chamber is in no manner essential to the invention, and, if preferred, it may be eliminated and the central portion of the valve head may be made solid, with an appropriate passage to open communication between port 27 and vacuum pipe 33, when the parts are in the position shown in the drawing. The operation of the apparatus will now be briefly described.

The cam 16, which is keyed or otherwise secured to the shaft 15, is designed to give the desired movements to the valve head 18, and this cam is continuously revolved in the direction indicated by the arrow. With the parts in the positions shown in the drawing, air under pressure is passing from pressure supply pipe to the annular pressure chamber 34, and then through ports 36 and 29 to pipe 14 to the front end of the shear cylinder; the shears having thus been opened and maintained open. Pressure from the rear end of the cylinder is simultaneously exhausting through pipe 13, port 26, passage 39 and port 25 to the atmosphere. The previously formed gob or charge has been severed, and the interior of the air bell is now being vacuumized to retard, stop or retract the flow of glass through the flow orifice, by means of the connections through pipe 10, pipe 28, port 27, port 44 and chamber 42, to vacuum pipe 33 leading to a pump or vacuum tank.

The cam is so designed that the rotation thereof will permit the parts to remain in the positions shown for the desired time; and the further continued rotation of the cam will move the valve head to a position to move port 44 out of alignment with port 27, and hence communication is shut off between the interior of the air bell and the source of vacuum, but the interior of the air bell remains sealed in this vacuumized condition during the continued rotation of the cam, for the desired duration. Thus far, the other parts so remain that pressure is being admitted to the front end of the cylinder and the rear end thereof is open to the atmosphere; the only thing having been changed so far is that communication has been shut off between the interior of the air bell and the source of vacuum.

The continued rotation of the cam moves the valve head to a position to bring port 45 into alignment with port 23, whereby pressure passes from the pressure chamber 34 to pipe 24 and thence through pipe 10 to the interior of the air bell. This plus pressure introduced into the interior of the bell will accelerate the flow of glass through the flow orifice, in the well known manner; the glass having been flowing by gravity alone for a short interval prior to the introduction of the plus pressure.

The parts will remain in this position for the desired interval of time, and the continued rotation of the cam will move port 38 into alignment with port 26 whereby pressure will be admitted to the rear end of the shear cylinder to close the shears and sever the formed charge, which will drop into a mold of a forming machine (not shown). At the same time vertical passage 37 is brought into alignment with port 29, whereby pressure from the front end of the shear cylinder exhausts through pipe 14, port 29, passage 37 and port 30 to the atmosphere.

Instantly after the shears have operated to sever the charge, the valve head snaps back to its original position, i. e., to the position shown in the drawing, whereby the shears are opened and the air bell is vacuumized in the manner hereinbefore described; thus completing a cycle of operation. As stated hereinbefore the valve head is preferably snapped back into its original position by means of the pressure constantly on top of the valve head, and which causes the roller 20 to continuously follow the surface of the cam.

From the foregoing description it will be apparent that the present invention provides an extremely simple feeder construction, which is inexpensive in manufacture, efficient in operation, and in which the various adjustments heretofore provided are neither necessary nor possible.

Having fully described the invention, what I claim is:

1. A pneumatic glass feeder including a flow spout having a flow orifice in the bottom thereof, shears arranged below the flow orifice, a cylinder for operating the shears, a pressure and vacuum chamber in the flow spout in substantial alignment with the flow orifice, and a single valve for controlling the alternate communication between said chamber and a source of pressure and a source of vacuum and periodically admitting pressure to the shear cylinder.

2. A pneumatic glass feeder including a flow spout having a flow orifice in the bottom thereof, an air bell in substantial alignment with the flow orifice, a single valve controlling the periodic increase and decrease of the pressure in said air bell to accelerate and retard the flow of glass, shears arranged below the flow orifice, and a cylinder for operating the shears, said single valve controlling the operation of the shears.

3. A pneumatic glass feeder including a flow spout having a flow orifice in the bottom thereof, an air bell in substantial alignment with the flow orifice, a single valve controlling the periodic increase and decrease of the pressure in said air bell to accelerate and retard the flow of glass, shears arranged below the flow orifice, a cylinder for operating the shears, said single valve controlling the operation of the shears, and a single cam for operating said valve.

4. A pneumatic glass feeder including a flow spout having a flow orifice in the bottom thereof, an air bell in the flow spout in substantial alignment with the flow orifice, shears arranged below the flow orifice, a cylinder for operating the shears, and a single valve controlling the pressure and vacuum condition in the air bell and the operation of the shears, said valve in one position opening communication between the interior of the air bell and a source of vacuum and opening communication between the front end of the shear cylinder and a source of pressure.

5. A pneumatic glass feeder including a flow spout having a flow orifice in the bottom thereof, an air bell in the flow spout in substantial alignment with the flow orifice, shears arranged below the flow orifice, a cylinder for operating the shears, and a single valve controlling the pressure and vacuum condition in the air bell and the operation of the shears, said valve in one position opening communication between the interior of the air bell and a source of pressure and opening communication between the rear end of the shear cylinder and a source of pressure.

6. A pneumatic glass feeder including a flow spout having a flow orifice in the bottom thereof, an air bell in the flow spout in substantial alignment with the flow orifice, shears arranged below the flow orifice, a cylinder for operating the shears, a single valve for controlling the periodic increase and decrease of pressure in the air bell and the operation of the shears, a cam for operating the valve stem, said valve stem being moved toward said cam by air pressure.

IRA H. FREESE.